US010019120B2

United States Patent
Jeong et al.

(10) Patent No.: US 10,019,120 B2
(45) Date of Patent: Jul. 10, 2018

(54) TOUCH PANEL INCLUDING METAL MESH AND DISPLAY DEVICE INCLUDING METAL MESH

(71) Applicant: Samsung Display Co., Ltd., Yongin-si (KR)

(72) Inventors: Hwan-Hee Jeong, Cheonan-si (KR); Yeon Tae Kim, Yongin-si (KR); Young Soo No, Seoul (KR); In Young Han, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 267 days.

(21) Appl. No.: 14/849,233

(22) Filed: Sep. 9, 2015

(65) Prior Publication Data

US 2016/0306487 A1    Oct. 20, 2016

(30) Foreign Application Priority Data

Apr. 14, 2015   (KR) .................. 10-2015-0052486

(51) Int. Cl.
   *G06F 3/044*   (2006.01)
(52) U.S. Cl.
   CPC .... *G06F 3/044* (2013.01); *G06F 2203/04103* (2013.01); *G06F 2203/04111* (2013.01); *G06F 2203/04112* (2013.01)
(58) Field of Classification Search
   CPC ........ G06F 3/044; G06F 3/0412; G06F 3/041; G06F 3/0416; G06F 3/047; G06F 2203/04112; G06F 2203/04103; G06F 2203/04111; G06F 1/16; G06F 1/13338; G02F 2001/133616; G09G 2300/0426
   See application file for complete search history.

(56) References Cited

U.S. PATENT DOCUMENTS

| | | | | |
|---|---|---|---|---|
| 2010/0302201 | A1* | 12/2010 | Ritter ...................... | G06F 3/044 345/174 |
| 2013/0207911 | A1* | 8/2013 | Barton .................. | G06F 3/0488 345/173 |
| 2014/0225839 | A1* | 8/2014 | Dunphy ................ | G06F 3/0412 345/173 |
| 2014/0291008 | A1* | 10/2014 | Huang ................. | H05K 1/0296 174/268 |

(Continued)

FOREIGN PATENT DOCUMENTS

| | | |
|---|---|---|
| JP | 2013-225195 | 10/2013 |
| JP | 2014-26485 | 2/2014 |

(Continued)

*Primary Examiner* — Nalini Mummalaneni
(74) *Attorney, Agent, or Firm* — H.C. Park & Associates, PLC (57) ABSTRACT

A touch panel including: a substrate; and a touch sensor part positioned on the substrate and including a metal mesh forming a plurality of openings. Openings which are adjacent to each other among the plurality of openings have different sizes of areas. A display device including: a display panel including a plurality of pixels; and a touch sensor part disposed on the display panel to cover the plurality of pixels and including a metal mesh forming a plurality of openings. Openings which are adjacent to each other among the plurality of openings have different sizes of areas.

9 Claims, 5 Drawing Sheets (56) References Cited

U.S. PATENT DOCUMENTS

2015/0177876 A1* 6/2015 Ishii .................. G06F 3/044
                                                    345/174
2016/0149572 A1* 5/2016 Chen ................. G06F 3/044
                                                    345/173

FOREIGN PATENT DOCUMENTS

| KR | 10-2013-0091518 | 8/2013 |
| KR | 10-1373044 | 3/2014 |

* cited by examiner

TOUCH PANEL INCLUDING METAL MESH AND DISPLAY DEVICE INCLUDING METAL MESH

CROSS-REFERENCE TO RELATED APPLICATION

This application claims priority from and the benefit of Korean Patent Application No. 10-2015-0052486, filed on Apr. 14, 2015, which is hereby incorporated by reference for all purposes as if fully set forth herein.

BACKGROUND

Field

Exemplary embodiments relate to a touch panel and a display device.

Discussion of the Background

A touch panel, which is a device for recognizing a touch input applied by an input device, e.g., a stylus or a finger of a user, has been widely adopted for a display panel such as an organic light emitting diode display, a liquid crystal display device, or the like and has been used as an input unit for device users to provide a signal to the display device.

The touch panel may include a substrate and a touch sensor part disposed on the substrate for recognizing the touch.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a touch panel and a display device having advantages of suppressing an occurrence of optical interference due to a metal mesh even in a case in which a touch sensor part includes the metal mesh.

Additional aspects will be set forth in the detailed description which follows, and, in part, will be apparent from the disclosure, or may be learned by practice of the inventive concept.

An exemplary embodiment discloses a touch panel including: a substrate; and a touch sensor part positioned on the substrate and including a metal mesh forming a plurality of openings. Openings which are adjacent to each other among the plurality of openings have different sizes of areas.

An exemplary embodiment also discloses a display device including: a display panel including a plurality of pixels; and a touch sensor part disposed on the display panel to cover the plurality of pixels and including a metal mesh forming a plurality of openings. Openings which are adjacent to each other among the plurality of openings have different sizes of areas.

An exemplary embodiment discloses a display device including: a display panel including a plurality of pixels; and a plurality of touch sensor parts disposed on the display panel to cover the plurality of pixels and including a metal mesh forming a plurality of openings. A first touch sensor part, among the plurality of touch sensor parts, includes first lines and second lines forming the metal mesh of the first touch sensor part, the first lines forming the metal mesh of the first touch sensor part being parallel to a first direction and the second lines forming the metal mesh of the first touch sensor part being parallel to a second direction intersecting the first direction, and a second touch sensor part, among the plurality of touch sensor parts, includes first lines and second lines forming the metal mesh of the second touch sensor part, the first lines forming the metal mesh of the second touch sensor part being parallel to a third direction and the second lines forming the metal mesh of the second touch sensor part being parallel to a fourth direction intersecting the first direction.

According to an exemplary embodiment, the touch panel and the display device capable of suppressing the occurrence of the optical interference due to the metal mesh may be provided.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch panel according to an exemplary embodiment will be described with reference to FIG. 1 and FIG. 2.

Figure 1:
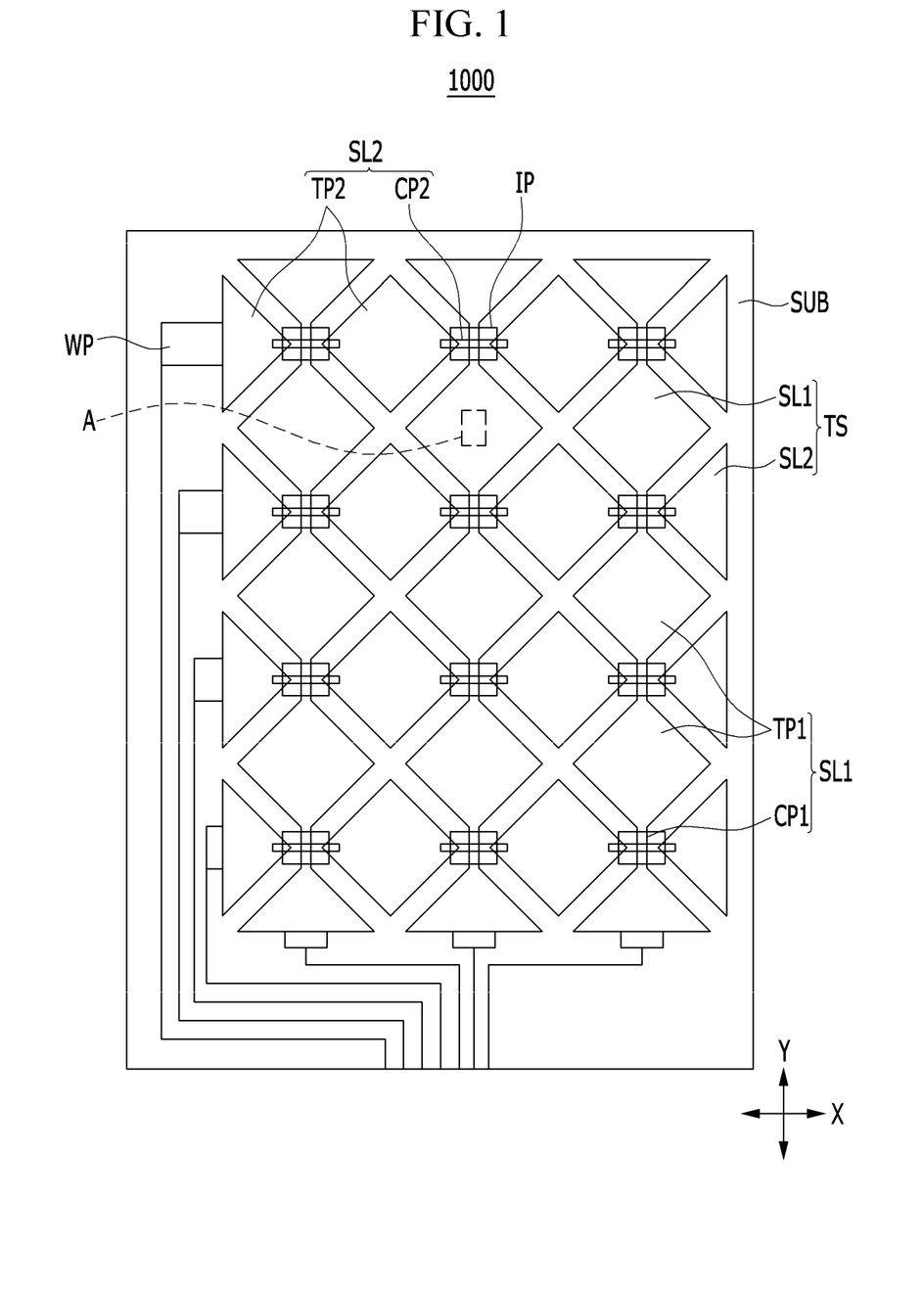
FIG. 1 is a plan view showing a touch panel according to an exemplary embodiment.

FIG. 1 is a plan view showing a touch panel according to an exemplary embodiment.

As shown in FIG. 1, a touch panel 1000 according to an exemplary embodiment is configured to recognize a touch input and includes a substrate SUB, a wiring part WP, and a touch sensor part TS. The touch panel 1000 may include a touch control part (not shown), and the touch control part may be formed in a form of a flexible printed circuit board, a printed circuit board, or the like so as to be connected to the wiring part WP. The touch control part may recognize a position on the touch panel 1000 touched by a user. The position may be calculated by digitizing an electrical analog signal transmitted from the touch panel 1000 into a digital signal using a converter, or the like.

The substrate SUB may be flexible, and may be a substrate including an organic material, an inorganic material, glass, or a metal such as stainless steel, or the like. The substrate SUB may be flexible, but is not limited thereto. For example, the substrate may be partially or entirely stretchable, foldable, bendable, or rollable. The substrate SUB may be flexible, stretchable, foldable, bendable, or rollable, such that the entire touch panel 1000 may be flexible, stretchable, foldable, bendable, or rollable.

The wiring part WP may be positioned at an outer region of the substrate SUB and one end thereof may be connected to the touch sensor part TS. The wiring part WP may connect between the touch sensor part TS and the touch control part, and may include an opaque conductive material such as a metal, or the like, or a transparent conductive material. The wiring part WP may be formed on the substrate SUB using a process different from that of the touch sensor part TS or the same process as that of the touch sensor part TS.

The touch sensor part TS is a portion that directly recognizes the touch, and may be formed to be at least partially transparent. The touch sensor part TS may be positioned on the substrate SUB to be formed as a capacitive type or a resistive type.

The touch sensor part TS may include a first signal line SL1 extended in a first direction on the substrate SUB and connected to the wiring part WP, and a second signal line SL2 extended in a second direction and connected to the wiring part WP. The second direction intersects the first direction. For example, the second direction may be perpendicular to the first direction.

There are a plurality of first signal lines SL1, and the plurality of first signal lines SL1 may be each sequentially arranged along the second direction.

The first signal line SL1 may include a first touch pad part TP1 and a first connection part CP1.

There are a plurality of first touch pad parts TP1, and the plurality of first touch pad parts TP1 are each disposed along the first direction so as to be spaced apart from each other. The first touch pad part TP1 may include a metal mesh. A detailed shape of the metal mesh will be described below. If the first touch pad part TP1 includes the metal mesh formed of a metal, a delay of a signal passing through the first touch pad part TP1 is suppressed or reduced.

The first connection part CP1 connects the plurality of first touch pad parts TP1 along the first direction. Specifically, the first connection part CP1 connects two adjacent ones of the first touch pad parts TP1. The first touch pad part TP1 and the first connection part CP1 may be formed integrally with each other, but are not limited thereto. For example, the first touch pad part TP1 and the first connection part CP1 may be formed of different materials. The first connection part CP1 intersects the second connection part CP2 and is insulated from the second connection part CP2.

There are a plurality of second signal lines SL2, and the plurality of second signal lines SL2 may be each sequentially arranged along the first direction.

There are a plurality of second touch pad parts TP2, and the plurality of second touch pad parts TP2 are each disposed in the second direction so as to be spaced apart from each other. The second touch pad part TP2 may include a metal mesh. A detailed shape of the metal mesh will be described below. If the second touch pad part TP2 includes the metal mesh formed of a metal, a delay of a signal passing through the second touch pad part TP2 is suppressed or reduced.

The second connection part CP2 connects the plurality of second touch pad parts TP2 along the second direction. Specifically, the second connection part CP2 connects two adjacent ones of the second touch pad parts TP2. The second touch pad part TP2 and the second connection part CP2 may be formed of different materials, but are not limited thereto.

For example, the second touch pad part TP2 and the second connection part CP2 may be formed integrally with each other. The second connection part CP2 intersects the first connection part CP1 and is insulated from the first connection part CP1.

The first signal line SL1 and the second signal line SL2 as described above intersect with each other so as to be insulated from each other, and an insulating pattern IP is interposed in a portion in which the first signal line SL1 and the second signal line SL2 intersect with each other. The above-mentioned insulating pattern IP may include one or more of silicon oxide $SiO_x$ and silicon nitride $SiN_x$, but is not limited thereto. For example, the insulating pattern IP may be formed in a shape of an insulating layer.

The first signal line SL1 and the second signal line SL2 may be positioned on the same layer or different layers on the substrate SUB.

When the first signal line SL1 and the second signal line SL2 are positioned on different layers, the insulating layer or the insulating pattern IP may be positioned between the first signal line SL1 and the second signal line SL2. Further, the second touch pad part TP2 and the first signal line SL1 may be disposed on the same layer while the second connection part CP2 disposed on another layer. According to an exemplary embodiment, the first touch pad part is TP1 and the second signal line SL2 may be disposed on the same layer while the first connection part CP1 is disposed on another layer.

In the touch panel 1000 having the configuration as described above, when a voltage is sequentially applied to the plurality of first signal lines SL1 and the plurality of second signal lines SL2, capacitance is formed between the first signal line SL1 and the second signal line SL2. In this case, when the touch is performed for the touch sensor part TS, the capacitance of a position at which the touch is performed is changed and the voltage applied to the first signal line SL1 or the second signal line SL2 is changed, such that the touch sensor part TS of the touch panel 1000 may detect whether the touch is performed for any position.

Hereinafter, the metal mesh included in the first touch pad part TP1 and the second touch pad part TP2, respectively, of the touch sensor part TS of the touch panel 1000 according to an exemplary embodiment will be described in detail with reference to FIG. 2.

Figure 2:
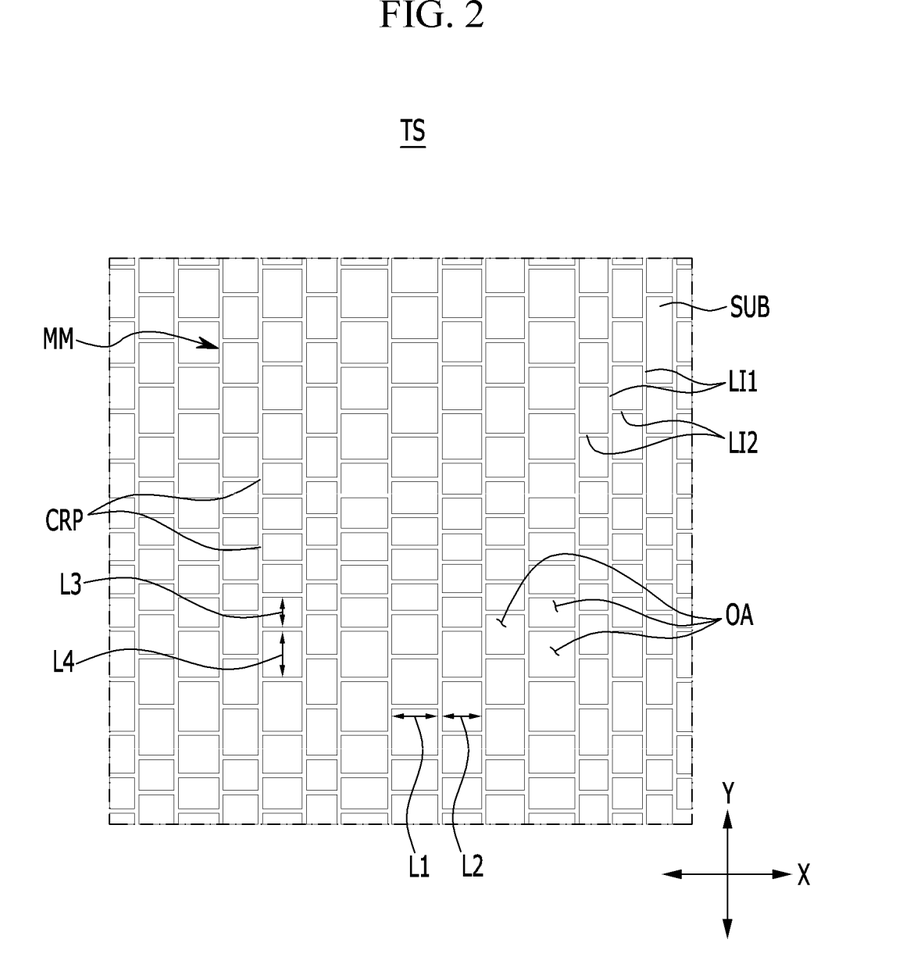
FIG. 2 is a plan view showing a portion A of FIG. 1.

FIG. 2 is a plan view showing a portion A of FIG. 1.

As shown in FIG. 2, the first touch pad part TP1 of the touch sensor part TS of the touch panel according to an exemplary embodiment includes a metal mesh MM. The metal mesh of the second touch pad part TP2 described above may also have the same structure as that of the metal mesh MM of the first touch pad part TP1.

The metal mesh MM includes a first line L11, a second line L12, and an opening OA.

There are a plurality of first lines L11, and the plurality of first lines L11 are spaced apart from each other along a first direction X and are extended in a second direction Y which intersects the first direction X. The plurality of first lines L11 arranged along the first direction X are spaced apart from each other by different distances. Specifically, a first distance L1 between one first line and another first line which are adjacent to each other in the first direction X among the plurality of first lines L11 is different from a second distance L2 between the other first line and still another first line which are adjacent to each other in the first direction X. The first distance L1 may be 0.1 times to ten times as large as the second distance L2. As such, the plurality of first lines L11 are spaced apart from each other in the first direction X by an irregular distance. A width of the first line L11 may be 1 μm to 10 μm, and for example, the width of the first line L11 may be 4 μm or less.

There are a plurality of second lines L12, and the plurality of second lines L12 are spaced apart from each other in the second direction Y and are extended in the first direction X, thereby connecting between two adjacent ones of the first lines L11 which are adjacent to each other among the plurality of first lines L11. The plurality of second lines L12 disposed in the second direction Y are spaced apart from each other by different distances. Specifically, a third distance L3 between one second line and another second line which are adjacent to each other in the second direction Y among the plurality of second lines L12 is different from a fourth distance L4 between the other second line and still another second line which are adjacent to each other in the second direction Y. The third distance L3 may have a distance 0.1 times to ten times as large as the fourth distance L4. As such, the plurality of second lines L12 are spaced apart from each other in the second direction by an irregular distance. A width of the second line L12 may be 1 μm to 10 μm, and for example, the width of the second line L12 may be 4 μm or less.

There are a plurality of openings OA, and each of the plurality of openings OA is surrounded by the first lines L11 which are adjacent to each other and the second lines L12 which are adjacent to each other.

The plurality of openings OA are formed by the plurality of first lines L11 and the plurality of second lines L12. The openings OA which are adjacent to each other among the plurality of openings OA are formed to have different areas. Specifically, since the plurality of first lines L11 are spaced apart from each other in the first direction by an irregular distance and the plurality of second lines L12 are spaced apart from each other in the second direction by an irregular distance, the area of each of the plurality of openings OA formed by the plurality of first lines L11 and the plurality of second lines L12 may be irregularly formed.

As described above, each of the first touch pad part TP1 and the second touch pad part TP2 of the touch sensor part TS of the touch panel 1000 according to an exemplary embodiment includes the metal mesh MM and further, the areas of the openings OA which are adjacent to each other among the plurality of openings OA formed by the metal mesh MM are different from each other, such that the distance between the plurality of first lines L11 forming the openings OA which are adjacent to each other is irregularly formed and the distance between the plurality of second lines L12 is irregularly formed at the same time. More specifically, the metal mesh MM included in the touch sensor part TS of the touch panel 1000 is formed to have an irregular matrix shape.

As such, an occurrence of an optical interference phenomenon, in which unintended constructive interference occurs between light reflected by the metal mesh MM from the outside, is suppressed in comparison with the metal mesh arranged in a regular matrix shape by forming the metal mesh MM of each of the first touch pad part TP1 and the second touch pad part TP2 in the irregular matrix shape. The irregular matrix of the metal mesh MM of the touch panel 1000 suppresses an unintended image such as moiré which may be caused by the optical interference phenomenon.

In addition, the metal mesh MM of the touch sensor part TS of the touch panel 1000 according to an exemplary embodiment is formed in the irregular matrix shape and consequently, since an intersection point CRP of the first line L11 and the second line L12 is formed by three straight lines ("branches") which are intersected with each other, an area of the intersection point CRP is formed to be smaller than an intersection point (the intersection point is formed by four straight lines which are intersected with each other) of the metal mesh arranged in the regular matrix shape. Thus, it may be minimized or reduced that the intersection point CRP of the metal mesh MM is viewed from the outside.

Additionally, since each of the first touch pad part TP1 and the second touch pad part TP2 of the touch sensor part TS of the touch panel 1000 according to an exemplary embodiment includes the metal mesh MM and consequently, each of the first touch pad part TP1 and the second touch pad part TP2 has low electric resistance in comparison with transparent conductive oxide such as indium tin oxide (ITO), or the like, a delay of a signal flowing in each of the first signal line SL1 and the second signal line SL2 is suppressed. Since the delay of the signal flowing in each of the first signal line SL1 and the second signal line SL2 is suppressed, the touch panel including the touch sensor part TS having improved sensitivity recognizing the touch is provided.

Furthermore, since each of the first touch pad part TP1 and the second touch pad part TP2 of the touch sensor part TS of the touch panel 1000 according to an exemplary embodiment includes the metal mesh MM, and further the substrate SUB is formed to be flexible, flexibility is generally improved. That is, a flexible touch panel can be provided.

Moreover, each of the first touch pad part TP1 and the second touch pad part TP2 of the touch panel 1000 according to an exemplary embodiment includes the metal mesh MM. Consequently, even in a case in which stress occurs in the touch panel 1000 according to a bending of the touch panel 1000, since each of the first touch pad part TP1 and the second touch pad part TP2 including the metal mesh MM easily bends by the stress and the stress is dispersed in each of the first touch pad part TP1 and the second touch pad part TP2 itself, it is suppressed that each of the first touch pad part TP1 and the second touch pad part TP2 is damaged by the stress. Thus, the touch panel in which the damage due to the stress is suppressed can be provided.

Hereinafter, a display device according to an exemplary embodiment will be described with reference to FIG. 3 and FIG. 4. Configurations which are at least partially different from the touch panel described above will be described.

An organic light emitting display device including an organic light emitting diode will be described as the display device by way of example, but the display device may be various display devices such as liquid crystal displays (LCDs), plasma displays (PDs), field emission displays (FEDs), electrophoretic displays (EPDs), electrowetting displays (EWDs), and the like as long as the display device includes a display part displaying an image and a touch sensor part recognizing a touch.

Figure 3:
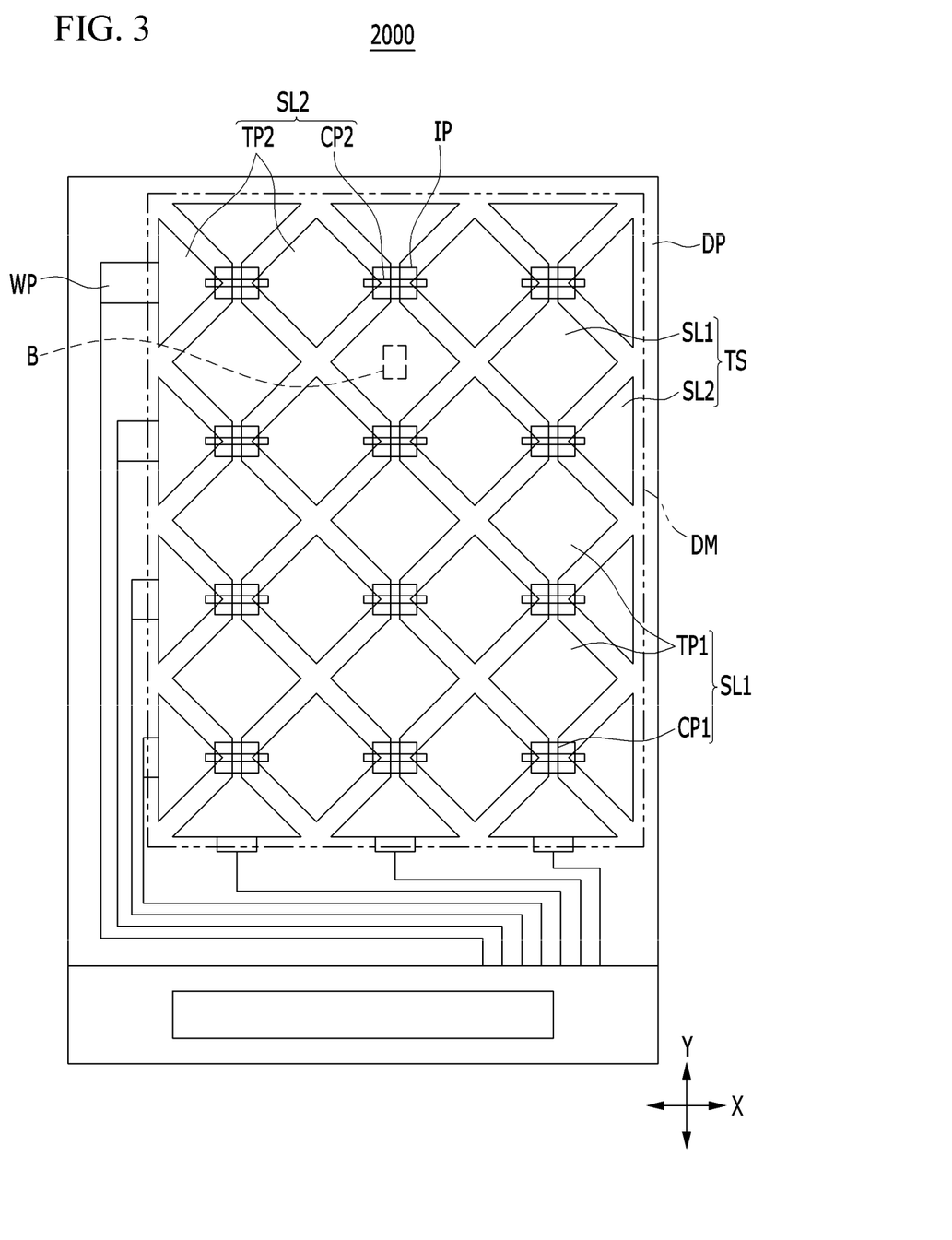
FIG. 3 is a plan view showing a display device according to an exemplary embodiment.

FIG. 3 is a plan view showing a display device according to an exemplary embodiment. FIG. 4 is a plan view showing a portion B of FIG. 3.

Figure 4:
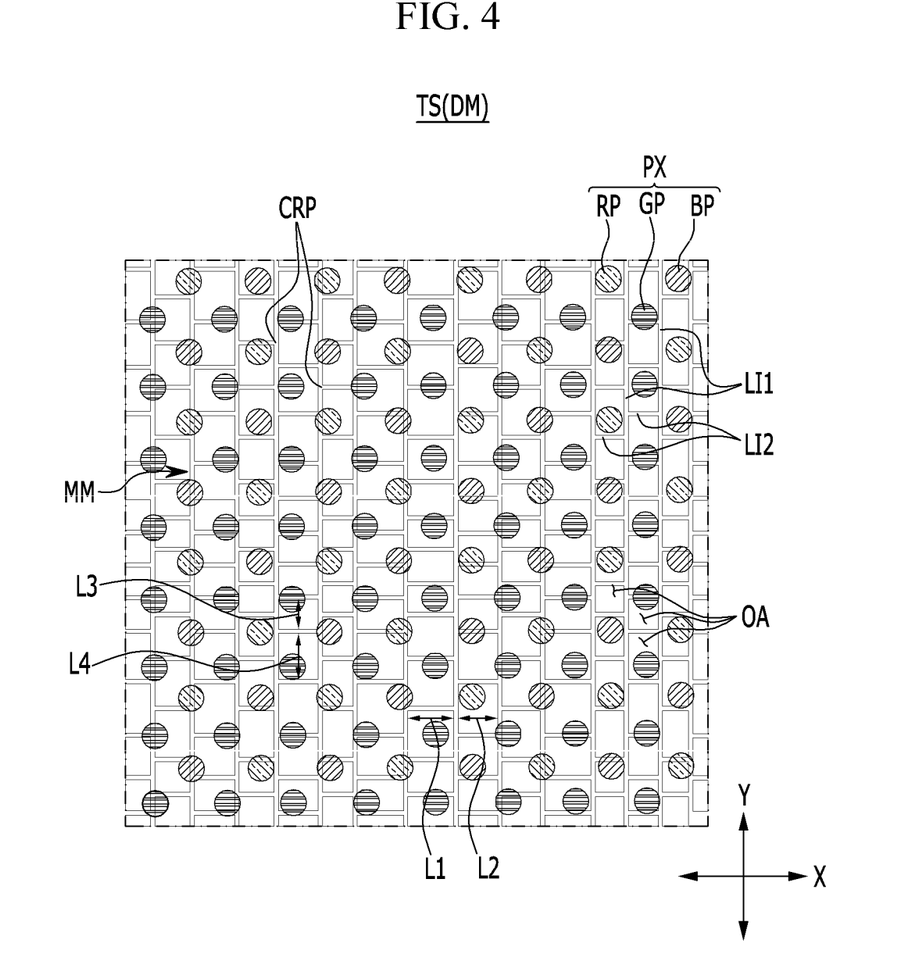
FIG. 4 is a plan view showing a portion B of FIG. 3.

As shown in FIG. 3 and FIG. 4, a display device 2000 according to an exemplary embodiment includes a display panel DP and a touch sensor part TS.

The display panel DP includes a display part DM displaying an image. The display part DM includes an organic light emitting diode (OLED) displaying the image. The display panel DP may be flexible, but is not limited thereto. For example, the display panel DP may be partially or entirely stretchable, foldable, bendable, or rollable. The display panel DP may be flexible, stretchable, foldable, bendable, or rollable, such that the entire display device 2000 may be flexible, stretchable, foldable, bendable, or rollable.

The display part DM of the display panel DP according to an exemplary embodiment includes the organic light emitting diode (OLED), but is not limited thereto. The display panel DP according to an exemplary embodiment may include one or more of liquid crystal, plasma, ink, and the like, and may include any configuration as long as it displays the image.

The display part DM includes a plurality of pixels PX.

Here, the pixel PX may refer to a minimum unit displaying the image. In addition, in the case in which the display part DM includes the organic light emitting diode, the pixel PX may be a region exposed by a pixel defined layer (not shown).

The plurality of pixels PX include a first pixel RP having a first color, a second pixel GP having a second color, and a third pixel BP having a third color. Here, the first color, the second color, and the third color may be colors different from each other or the same color as each other. For example, each of the first color, the second color, and the third color may be one or more colors of red, green, blue, white, yellow, cyan, and magenta, but is not limited thereto.

The plurality of pixels PX may be disposed in a regular matrix shape. Since the plurality of pixels PX are disposed in the regular matrix shape, some pixels PX or more of the plurality of pixels PX are disposed in a direction which is in parallel to one or more directions of the first direction X and the second direction Y.

The touch sensor part TS is positioned on the display panel DP.

The touch sensor part TS covers the plurality of pixels PX on the display panel DP and includes a metal mesh MM forming a plurality of openings OA.

The metal mesh MM includes a first line L11, a second line L12, and an opening OA.

There are a plurality of first lines L11, and the plurality of first lines L11 are spaced apart from each other in the first direction X and are extended in the second direction Y which intersects the first direction X. The plurality of first lines L11 disposed in the first direction X are spaced apart from each other by different distances (e.g., irregular distances described above). Specifically, a first distance L1 between one first line and another first line which are adjacent to each other in the first direction X among the plurality of first lines L11 is different from a second distance L2 between the other first line and still another first line which are adjacent to each other in the first direction X. The first distance L1 may have a distance 0.1 times to ten times as large as the second distance L2. As such, the plurality of first lines L11 are spaced apart from each other in the first direction by an irregular distance. A width of each of the plurality of first lines L11 is smaller than a width of the pixel PX in one direction, thereby preventing an overall region of one pixel PX from being covered by the first line L11.

There are a plurality of second lines L12, and the plurality of second lines L12 are spaced apart from each other in the second direction Y and are extended in the first direction X, thereby connecting two adjacent ones of the first lines L11 among the plurality of first lines L11. The plurality of second lines L12 disposed in the second direction Y are spaced apart from each other by different distances. Specifically, a third distance L3 between one second line and another second line which are adjacent to each other in the second direction Y among the plurality of second lines L12 is different from a fourth distance L4 between the other second line and still another second line which are adjacent to each other in the second direction Y. The third distance L3 may be 0.1 times to ten times as large as the fourth distance L4. As such, the plurality of second lines L12 are spaced apart from each other in the second direction by an irregular distance. A width of each of the plurality of second lines L12 is smaller than a width of the pixel PX in one direction, thereby preventing an overall region of one pixel PX from being covered by the second line L12.

There are a plurality of openings OA, and each of the plurality of openings OA is surrounded by the first lines L11 which are adjacent to each other and the second lines L12 which are adjacent to each other.

The plurality of openings OA are formed by the plurality of first lines L11 and the plurality of second lines L12. The openings OA which are adjacent to each other among the plurality of openings OA may be formed to have different areas. Specifically, since the plurality of first lines L11 are spaced apart from each other in the first direction by an irregular distance and the plurality of second lines L12 are spaced apart from each other in the second direction by the irregular distance, the area of each of the plurality of openings OA formed by the plurality of first lines L11 and the plurality of second lines L12 may be irregularly formed.

As described above, the plurality of pixels of the display part DM of the display device 2000 according to an exemplary embodiment are disposed in the regular matrix shape, while the metal mesh MM of the touch sensor part TS covering the plurality of pixels PX is formed in the irregular matrix shape.

As such, in the display device 2000 according to an exemplary embodiment, even in the case in which the plurality of pixels PX are disposed in the regular matrix shape, since an occurrence of an optical interference phenomenon in which unintended constructive interference occurs between light reflected by the metal mesh MM from the outside or light emitted from the plurality of pixels PX and reflected by the metal mesh MM is suppressed in comparison with the metal mesh arranged in the regular matrix shape by forming the metal mesh MM in the irregular matrix shape, it is suppressed that an unintended image such as moiré which may be caused by the optical interference phenomenon is viewed from the display device 2000.

In addition, the metal mesh MM of the touch sensor part TS of the display device 2000 according to an exemplary embodiment is formed in the irregular matrix shape. Consequently, since an intersection point CRP of the first line L11 and the second line L12 is formed by three straight lines which are intersected with each other, an area of the intersection point CRP is formed to be smaller than an intersection point (the intersection point is formed by four straight lines which are intersected with each other) of the metal mesh arranged in the regular matrix shape. Thus, it is minimized that the intersection point CRP of the metal mesh MM is viewed from the outside, and only a small area of one pixel PX overlapped with the intersection point CRP of the metal mesh MM is covered by the metal mesh MM at the same time, thereby providing the display device 2000 capable of minimizing a decrease in efficiency of the image displayed by the plurality of pixels PX.

In addition, in the display device 2000 according to an exemplary embodiment, since the touch sensor part TS including the metal mesh MM having the irregular matrix shape is positioned on the plurality of pixels PX arranged in the regular matrix shape, it is suppressed that all the plurality of first lines L11 included in the metal mesh MM and disposed in the first direction X cover the plurality of pixels PX in the same column, or all the plurality of second lines L12 included in the metal mesh MM and disposed in the second direction Y cover the plurality of pixels PX in the same row. Thus, it is suppressed that only pixels PX having the same color and disposed in the same row or the same column among the plurality of pixels PX are covered by the metal mesh MM, thereby providing the display device 2000 capable of minimizing or reducing a decrease in efficiency of the image displayed by the plurality of pixels PX.

In addition, since the touch sensor part TS of the display device 2000 according to an exemplary embodiment includes the metal mesh MM. Consequently, the touch sensor part TS has low electric resistance in comparison with transparent conductive oxide such as indium tin oxide (ITO), or the like, a delay of a signal flowing in each of the first signal line SL1 and the second signal line SL2 is suppressed. Since the delay of the signal flowing in each of the first signal line SL1 and the second signal line SL2 is suppressed, the display device 2000 including the touch sensor part TS having improved sensitivity recognizing a touch input is provided.

In addition, since the touch sensor part TS of the display device 2000 according to an exemplary embodiment includes the metal mesh MM, and further the display panel DP is formed to be flexible, flexibility is generally improved. Thus, a flexible display device can be provided.

In addition, the touch sensor part TS of the display device 2000 according to an exemplary embodiment includes the metal mesh MM. Consequently, even in a case in which stress occurs in the touch sensor part TS according to a bending of the display panel DP, since each of the first touch pad part TP1 and the second touch pad part TP2 including the metal mesh MM easily bend by the stress and the stress is dispersed in each of the first touch pad part TP1 and the second touch pad part TP2 itself, it is suppressed that each of the first touch pad part TP1 and the second touch pad part TP2 is damaged by the stress. Thus, the display device 2000 in which the damage on the touch sensor part TS due to the stress is suppressed can be provided.

Hereinafter, a display device according to an exemplary embodiment will be described with reference to FIG. 5. Hereinafter, configurations which are different from the display device of FIG. 1 through FIG. 4 will be described.

Figure 5:
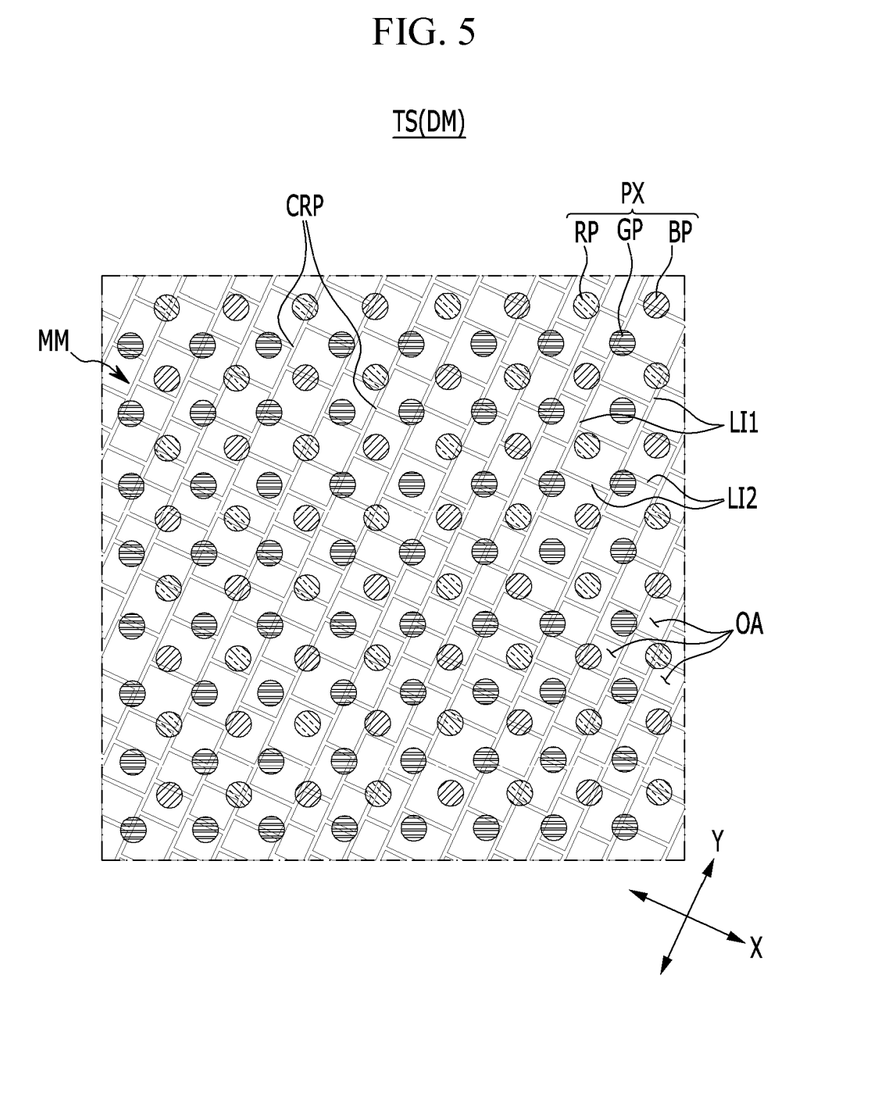
FIG. 5 is a plan view showing a portion of a display device according to an exemplary embodiment.

FIG. 5 is a plan view showing a portion of the display device according to an exemplary embodiment. FIG. 5 may be an exemplary configuration of the area B of FIG. 3, but is not limited as such.

A plurality of pixels PX of a display part DM of the display device according to an exemplary embodiment are disposed in a regular matrix shape. Some pixels PX or more of the plurality of pixels PX are disposed in a direction which intersects a first direction X and a second direction Y.

Each of a first line L11 and a second line L12 of a metal mesh MM of the touch sensor part TS is extended to be tilted with the arrangement direction of the plurality of pixels PX by a predetermined angle. The tilting angle or direction of the first line L11 and the second line L12 may be different for each touch sensor part TS.

As described above, the plurality of pixels PX of the display part DM of the display device 2000 according to an exemplary embodiment are disposed in the regular matrix shape, while the metal mesh MM of the touch sensor part TS covering the plurality of pixels PX is formed in the irregular matrix shape and is tilted with the arrangement direction of the plurality of pixels PX by the predetermined angle at the same time.

As such, in the display device 2000 according to an exemplary embodiment, even in the case in which the plurality of pixels PX are disposed in the regular matrix shape, since an occurrence of an optical interference phenomenon in which unintended constructive interference occurs between light reflected by the metal mesh MM from the outside or light emitted from the plurality of pixels PX and reflected by the metal mesh MM is suppressed in comparison with the metal mesh arranged in the regular matrix shape by forming the metal mesh MM in the irregular matrix shape and tilting the metal mesh MM from the arrangement direction of the plurality of pixels PX by the predetermined angle at the same time, it is suppressed that an unintended image such as moiré which may be caused by the optical interference phenomenon is viewed from the display device 2000.

In addition, the metal mesh MM of the touch sensor part TS of the display device 2000 according to an exemplary embodiment is formed in the irregular matrix shape and is tilted with the arrangement direction of the plurality of pixels PX by the predetermined angle at the same time, and consequently, since an intersection point CRP of the first line L11 and the second line L12 is formed by three straight lines which are intersected with each other, an area of the intersection point CRP is formed to be smaller than an intersection point (the intersection point is formed by four straight lines which are intersected with each other) of the metal mesh arranged in a regular matrix shape.

Thus, it is minimized or reduced that the intersection point CRP of the metal mesh MM is viewed from the outside, and only a small area of one pixel PX overlapped with the intersection point CRP of the metal mesh MM is covered by the metal mesh MM at the same time, thereby providing the display device 2000 capable of minimizing or reducing a decrease in efficiency of the image displayed by the plurality of pixels PX.

In addition, in the display device 2000 according to an exemplary embodiment, since the touch sensor part TS including the metal mesh MM having the irregular matrix shape and tilted from the arrangement direction of the plurality of pixels PX by the predetermined angle at the same time is positioned on the plurality of pixels PX arranged in the regular matrix shape, it is suppressed that the first lines L11 included in the metal mesh MM and extended in the second direction Y cover the plurality of pixels PX in the same column, or the second lines L12 included in the metal mesh MM and extended in the first direction X cover the plurality of pixels PX in the same row.

Thus, it is suppressed that only pixels PX having the same color and disposed in the same row or the same column among the plurality of pixels PX are covered by the metal mesh MM, thereby providing the display device 2000 capable of minimizing or reducing a decrease in efficiency of the image displayed by the plurality of pixels PX.

In addition, in the display device 2000 according to an exemplary embodiment, since the touch sensor part TS including the metal mesh MM having the irregular matrix shape and tilted from the arrangement direction of the plurality of pixels PX by the predetermined angle at the same time is positioned on the plurality of pixels PX arranged in the regular matrix shape, it is suppressed that all the plurality of first lines L11 included in the metal mesh MM and disposed in the first direction X cover the plurality of pixels PX in the same column, or all the plurality of second lines L12 included in the metal mesh MM and disposed in the second direction Y cover the plurality of pixels PX in the same row. Thus, it is suppressed that only pixels PX having the same color and disposed in the same row or the same column among the plurality of pixels PX are covered by the metal mesh MM, thereby providing the display device 2000 capable of minimizing or reducing a decrease in efficiency of the image displayed by the plurality of pixels PX.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
a substrate; and
a touch sensor part positioned on the substrate and including a metal mesh forming a plurality of openings,
wherein openings which are adjacent to each other among the plurality of openings have different sizes of areas, and
wherein the metal mesh includes:
a plurality of first lines spaced apart from each other in a first direction and extended in a second direction which intersects the first direction;
a plurality of second lines spaced apart from each other in the second direction, extended in the first direction, connected to, and terminating at two adjacent ones of the first lines among the plurality of first lines; and
a first distance between two adjacent first lines among the plurality of first lines is different from a second distance between another two adjacent first lines among the plurality of first lines,
wherein the substrate has an edge extending in the second direction,
the plurality of first lines are straight lines,
the plurality of first lines and the plurality of second lines define the plurality of openings,
a third distance between two adjacent second lines among the plurality of second lines is different from a fourth distance between another two adjacent second lines among the plurality of second lines, and
each of the openings is surrounded by two adjacent first lines and two adjacent second lines, and
wherein the touch sensor part comprises:
a plurality of first touch pad parts disposed on the substrate, spaced apart from each other in one direction, and including the metal mesh;
a first connection part connecting two adjacent ones of the plurality of first touch pad parts and integrally formed with the two adjacent ones of the plurality of first touch pad parts;
a plurality of second touch pad parts disposed on the substrate, spaced apart from each other in another direction which intersects the one direction, and including the metal mesh; and
a second connection part intersecting the first connection part, the second connection part being insulated from the first connection part, and connecting two adjacent ones of the plurality of second touch pad parts.

2. A display device, comprising:
a display panel comprising a plurality of pixels; and
a touch sensor part disposed on the display panel to cover the plurality of pixels and comprising a metal mesh forming a plurality of openings, wherein openings which are adjacent to each other among the plurality of openings have different sizes of areas, and wherein the metal mesh comprises:

a plurality of first lines spaced apart from each other in a first direction and extended in a second direction which intersects the first direction;

a plurality of second lines spaced apart from each other in the second direction, extended in the first direction, connected to, and terminating at two adjacent ones of the first lines among the plurality of first lines; and a first distance between two adjacent first lines among the plurality of first lines is different from a second distance between another two adjacent first lines among the plurality of first lines, wherein the display panel has an edge extending in the second direction, the plurality of first lines are straight lines, the plurality of first lines and the plurality of second lines define the plurality of openings, a third distance between two adjacent second lines among the plurality of second lines is different from a fourth distance between another two adjacent second lines, and each of the openings is surrounded by two adjacent first lines and two adjacent second lines, wherein the touch sensor part comprises:

a plurality of first touch pad parts disposed on a substrate spaced apart from each other in one direction, and including the metal mesh;

a first connection part connecting two adjacent ones of the plurality of first touch pad parts;

a plurality of second touch pad parts disposed on the substrate, spaced apart from each other in another direction which intersects the one direction and including the metal mesh; and a second connection part intersecting the first connection part, the second connection part being insulated from the first connection part and connecting two adjacent ones of the plurality of second touch pad parts, wherein the first touch pad parts and the first connection parts are integrally formed with each other.

3. The display device of claim 2, wherein:

a width of each of the first line and the second line is smaller than a width of each of the pixels in one direction.

4. The display device of claim 2, wherein:

the plurality of pixels are disposed in a regular matrix shape.

5. The display device of claim 4, wherein:

at least one row or column of the plurality of pixels is disposed in a direction which is in parallel to the first direction or the second direction.

6. The display device of claim 4, wherein:

at least one row or column of the plurality of pixels is disposed in a direction which intersects the first direction and the second direction.

7. A display device, comprising:

a display panel comprising a plurality of pixels; and a plurality of touch sensor parts disposed on the display panel to cover the plurality of pixels and comprising a metal mesh forming a plurality of openings, wherein a first touch sensor part, among the plurality of touch sensor parts, comprises first lines and second lines forming the metal mesh of the first touch sensor part, the first lines forming the metal mesh of the first touch sensor part being spaced apart in a first direction and parallel to a second direction, and the second lines forming the metal mesh of the first touch sensor part being spaced apart in the second direction, parallel to the first direction intersecting the first direction, and connected to and terminating at two adjacent ones of the first lines of the first touch sensor part, wherein a second touch sensor part, among the plurality of touch sensor parts, comprises first lines and second lines forming the metal mesh of the second touch sensor part, the first lines forming the metal mesh of the second touch sensor part being spaced apart and parallel to a third direction, and the second lines forming the metal mesh of the second touch sensor part being spaced apart, parallel to a fourth direction intersecting the third direction, and connected to and terminating at two adjacent ones of the first lines of the second touch sensor part, and wherein a first distance between two adjacent first lines forming the mesh of the first and second touch sensor part is different from a second distance between another two adjacent first lines forming the mesh of the first and second touch sensor part, wherein the display panel has an edge extending in the second direction, the first lines are straight lines, and the first lines and the second lines define the plurality of openings, wherein the openings which are adjacent to each other among the plurality of openings have different sizes of areas, wherein the plurality of touch sensor parts comprise:

a plurality of the first touch sensor parts disposed on the display panel, spaced apart from each other in one direction, and including the metal mesh;

a first connection part connecting two adjacent ones of the plurality of first touch sensor parts and integrally formed with the two adjacent ones of the plurality of first touch sensor parts;

a plurality of the second touch sensor parts disposed on the display panel, spaced apart from each other in another direction which intersects the one direction and including the metal mesh; and a second connection part intersecting the first connection part, the second connection part being insulated from the first connection part, and connecting two adjacent ones of the plurality of second touch sensor parts.

8. The display device of claim 7, wherein:

each of the first direction, the second direction, the third direction, and the fourth direction is not parallel to each other.

9. The display device of claim 7, wherein:

a connection point of one of the first lines and one of the second lines forming the metal mesh of at least one of the first touch sensor part and the second touch sensor part has no more than three branches.

* * * * *